United States Patent [19]

Shih et al.

[11] Patent Number: 5,186,961
[45] Date of Patent: Feb. 16, 1993

[54] METHOD AND COMPOSITION FOR MAINTAINING ANIMALS ON A KERATIN-CONTAINING DIET

[75] Inventors: Jason C. H. Shih, Cary, N.C.; Chung-Ginn Lee, Taipei, Taiwan

[73] Assignee: North Carolina State University, Raleigh, N.C.

[21] Appl. No.: 670,122

[22] Filed: Mar. 15, 1991

[51] Int. Cl.$^5$ .......................... A23K 1/04; A23K 1/10
[52] U.S. Cl. .......................................... 426/2; 426/56; 426/59; 426/623; 426/630; 426/643; 426/646; 426/647; 426/657; 426/807; 426/805
[58] Field of Search ...................... 426/805, 2, 56, 59, 426/657, 647, 646, 807, 623, 630, 643, 630

[56] References Cited

U.S. PATENT DOCUMENTS

| | | | |
|---|---|---|---|
| 2,988,487 | 6/1961 | Nickerson et al. | 195/5 |
| 3,578,461 | 5/1971 | Weeks et al. | 426/56 |
| 4,808,417 | 2/1989 | Masuda | 426/2 |
| 4,908,220 | 3/1990 | Shih et al. | 426/657 |
| 4,944,944 | 7/1990 | Tang et al. | 426/2 |
| 4,959,311 | 9/1990 | Shih et al. | 435/68.1 |

OTHER PUBLICATIONS

Veterinary Pharmacology and Therapeutics, Nicholas H. Booth and Leslie E. McDonald, p. 596, Section 10, Drugs Acting On The Digestive System.

J. Adler-Nissen, "Enzymic Hydrolysis of Food Proteins," Elsevier Applied Science Publishes Ltd., (Galliard Printers Ltd., Great Britain), pp. 99-100 (1986).

*Primary Examiner*—R. B. Penland
*Attorney, Agent, or Firm*—Bell, Seltzer, Park & Gibson

[57] ABSTRACT

Methods and compositions for maintaining animals on a diet containing keratin as a source of protein are disclosed. The method comprises feeding an animal a carbohydrate source and a first protein source, the first protein source comprising keratin and a keratinase capable of hydrolyzing the keratin. A composition of the present invention is an animal feed comprising a carbohydrate source and a first protein source, the first protein source comprising keratin and a keratinase capable of hydrolyzing the keratin. A preferred keratin for practicing the present invention is ground feather, and a preferred keratinase for practicing the invention is obtained from *Bacillus licheniformis* strain PWD-1.

11 Claims, No Drawings

METHOD AND COMPOSITION FOR MAINTAINING ANIMALS ON A KERATIN-CONTAINING DIET

FIELD OF THE INVENTION

The present invention relates to methods and compositions which are useful for enhancing the digestibility and utilization of keratinaceous materials fed to animals as a source of dietary protein.

BACKGROUND OF THE INVENTION

Keratinaceous materials are often included in animal feeds as an inexpensive source of dietary protein. Keratins such as feather, horn, hooves, and hair are readily available as agricultural byproducts. A problem with feeding animals such materials, however, is that they are difficult to digest. J. Adler-Nissen, *Enzymic Hydrolysis of Food Proteins*, 100 (1986). Hence, the amount of amino acids taken up into animals from such materials is relatively small compared to the total amount of amino acids present in such materials.

A solution to the foregoing problem is reported in U.S. Pat. No. 4,908,220 to J. Shih and C. Williams, issued Mar. 13, 1990. This patent describes a hydrolyzed feather animal feed supplement consisting of feather hydrolyzed by fermenting it with *Bacillus licheniformis* PWD-1 prior to feeding the material to the animal. While the technology disclosed in this application provides a way to substantially increase the digestability of feather, it necessitates a fermentation step which adds to the complexity of manufacturing the feed.

In view of the foregoing, an object of the present invention is to provide a way to increase the digestibility of keratin, which keratin is included in an animal feed as a source of dietary protein, without the necessity of fermenting the material prior to feeding.

SUMMARY OF THE INVENTION

The present invention is based on our discovery that a keratinase fed to an animal with a keratin-containing animal feed will enhance the digestability of that feed. A first aspect of the present invention is, accordingly, a method of maintaining an animal on a keratin-containing diet comprising feeding the animal a carbohydrate source and a first protein source, the first protein source comprising keratin, and a keratinase capable of hydrolyzing the keratin. The animal may optionally be concurrently fed a supplemental, second protein source.

A second aspect of the present invention is an animal feed comprising a carbohydrate source and a first protein source, the first protein source comprising keratin and a keratinase capable of hydrolyzing the keratin.

DETAILED DESCRIPTION OF THE INVENTION

Animal feeds of the present invention comprise a carbohydrate source in combination with a protein source. Carbohydrate sources used to produce an animal feed according to the present invention include, for example, corn, oats, barley, sorghum, or combinations of the same. These grains are preferably ground into a meal for use in the animal feed. Supplementary protein source include, for example, soy meal, fish meal, blood meal, poultry by-product (ground poultry offal), meat meal, and combinations of the same. An animal feed is comprised of from about 13% to about 25% by weight of protein from all protein sources (including both the keratin source and the supplementary protein source). The keratin may be the sole protein source, but is preferably from about 2% to about 15% by weight of the feed. Other nutrients in small amounts, such as vitamins, minerals, antibiotics, and other substances or compounds may be included in the feed as required. The present invention can be used to feed any animal, including cows, sheep, pigs, cats, dogs, ferrets, and birds (e.g., chickens, ducks, and turkeys), but is preferably employed with monogastric animals. The precise composition and physical characteristics of the animal feed will, accordingly, depend upon the species for which the feed is intended, and can be readily determined by those skilled in the art. Thus, the present invention provides a variety of different feeds, including pet feed, poultry feed, and pig feed.

Keratin used as a protein source in practicing the present invention is preferably feather, but may be another keratin material such as hair, horn, or hoove. The material is preferably ground to a consistency suitable for inclusion in an animal feed (e.g., powdered feather or feather meal). If desired, the keratin may be partially degraded by steam or enzymatic means prior to combining with the keratinase, in which case the keratinase serves as a means to further increase the digestibility of the keratin. However, since prior enzymatic digestion adds to the production cost of the feed, the currently preferred embodiment of the present invention employs a keratin which has not been previously subjected to enzymatic degredation.

Keratinases are fed to the animal concurrently with the keratin in an amount effective to enhance the digestibility of the keratin. A suitable ratio of keratinase to keratin is about 1:100 by weight. The keratinase should be present in an amount at least sufficient to achieve the intended effect, but the upper limit to the amount of keratinase included is not particularly critical. The keratinase may be included in the same composition as the keratin, as in the case of the animal feeds of the present invention, or may be administered separately but concurrently with the keratin (e.g., by inclusion in drinking water). While we do not wish to be bound to any particular theory of operation of this invention, it appears that the keratinase retains activity while it is in the digestive tract of the animal being fed for a time sufficient for it to hydrolyze the keratin and enhance the digestibility thereof.

A preferred keratinase for practicing the present invention is obtained from *Bacillus licheniformis* strain PWD-1, which is described in U.S. Pat. Nos. 4,908,220 and 4,959,311 (the disclosures of all patent references cited herein are to be incorporated herein by reference). This bacteria was deposited with the American Type Culture Collection (ATCC) in Rockville, MD, USA in accordance with the Budapest Treaty on Mar. 23, 1988, and assigned ATCC Accession No. 53757. Other keratinases which can be used to practice the present invention are available from a variety of bacterial sources, such as *Streptomyces fradiae*. See generally U.S. Pat. No. 2,988,487 to Nickerson; See also Göktan, D., "Decomposition Rates of Keratinous Material Used by Certain Microorganisms," (Abstract No. 207369b), *Microbial Biochem.* 101, 333 (1984); Daniels, G., "The Digestion of Human Hair Keratin by Microsporum Canis," J. Gen. *Microbiol.* 8, 289 (1953); Koh, W. et al., "Keratinolytic Enzymes from Aspergillus flavus and Aspergillus niger," *Bacillus. Aust. J. Biol. Sci.* 274 (1959); Molyneaux, G. S., "The Digestion of Wool by a Keratinolytic Bacillus," *Aust. J. Biol. Sci.* 274 (1959); Noval, J.and Nickerson, W., "Decomposition of Native Keratin by Streptomyces Fradiae," *J. Bacteriol.* 77, 251 (1959); Kapica, L. and Blank, F., "Growth of Candida Parapsilosis with Keratin as Sole Source of Nitrogen," *Dermatologica* 117, 433 (1958); Kapica, L. and Blank, F., "Growth of Albicans on Keratin as Sole Source of Nitrogen," *Dermatologica* 115, 81 (1957).

Keratinases used in practicing the present invention may be in crude form or in pure form. Keratinases in crude form may be prepared, for example, by separating bacterial cells which produce the keratinase from their liquid growth media, the liquid growth media comprising crude keratinase. Alternatively, the cells may be lysed (chemically or physically) in a liquid growth media to produce a crude, cell free extract. Other means of preparing such an extract will be apparent to persons skilled in the art. The crude keratinase may be included in the feed in any form compatible therewith, such as in an aqueous form or in lyophylized form. The lyophylized form is currently preferred.

Pure (or substantially pure) keratinases may be obtained by separating the crude keratinase described above into its individual constituents, in accordance with known techniques. See generally W. Jakoby, Ed., Enzyme purification and Related *Techniques, Methods in Enzymology*, vol. 22 (1971) and vol. 104, pt. C (1984), Academic Press, NY. Numerous suitable separation procedures, such as column chromatography, are known to persons skilled in the art. The individual constituent proteins may, if necessary, be screened for their ability to degrade keratinaceous material, and that constituent which best degrades keratinaceous material comprises the keratinase. Like the crude keratinase, the pure keratinase may be employed in any suitable form, including aqueous form and lyophylized form.

The present invention is exemplified further in the non-limiting examples set forth below.

EXAMPLE 1

Preparation of Crude Keratinase Enzyme

A crude keratinase enzyme (KE) capable of degrading feather is obtained from *Bacillus licheniformis* strain PWD-1 in accordance with standard techniques. Being an extracellular enzyme, keratinase is isolated from the culture medium of *Bacillus licheniformis* PWD-1 which is grown on feathers as the sole source of carbon, nitrogen, and energy as previously described. See U.S. Pat. Nos. 4,908,220 and 4,959,311. The culture medium is prefiltered to remove residual undegraded feathers and bacterial cells, and then concentrated by membrane ultrafiltration to select proteins having a molecular weight greater than 10,000 daltons. The concentrated preparation is then lyophilized.

EXAMPLE 2

Preparation of Pure Keratinase Enzyme

A crude lyophylized keratinase prepared as described in Example 1 above is fractionated by CM-cellulose ion exchanger followed by Sephadex G-100 gel permeation. SDS-polyacrylamide gel electrophoresis analysis indicates that the keratinase has a Molecular weight of about 30,000 daltons.

EXAMPLE 3

Precision-Fed Assay

A precision-fed assay is carried out in accordance with known procedures. See H. Enbster et al., Poultry Science 65, 487-498 (1985). Fasted adult roosters are ravaged with 20 grams of raw feather powder (RF) or commercial feather meal (CFM), with or without lyophylized keratinase (KE) prepared as described in Example 1 above. The lyophylized keratinase is mixed with the keratin in a proportion of 1:1000 by weight. The excreta and feed samples are chemically analyzed. The addition of KE increased the total amino acid digestibility of RF from about 30 to about 66% and CFM from about 77 to about 90%.

EXAMPLE 4

Growth Assay of Three-Week Old Chicks

This is the most commonly used method in evaluating feedstuff. It is an assay to determine the general bioavailability of the tested protein in supporting the growth of young chicks without knowing the digestibility of individual amino acids. Three week old chicks are divided into three groups. After protein deficiency for three days, they are fed normal 20% (by weight) protein diets with soybean meal (SBM), CFM, and CFM plus KE (1000:1) as the major protein source. Their body weights is monitored for eight days until exhaustion of KE. The weight gains (g/day) is SBM: about 66, CFM: about 50, and CFM plus KE: about 56.

Both Examples 3 and 4 demonstrate that the addition of KE improved the digestibility of a keratinaceous product, indicating the potential of KE as an additive to enhance the nutritional value of CFM.

The foregoing Examples are illustrative of the present invention, and are not to be taken as limiting thereof. The invention is defined by the following claims, with equivalents of the claims to be included therein.

That which is claimed is:

1. A method of maintaining an animal on a keratin-containing diet comprising feeding the animal a carbohydrate source and a first protein source, the first protein source comprising keratin, concurrently with a keratinase capable of hydrolyzing said keratin in an amount effective to enhance the digestibility of said keratin in the digestive tract of said animal.

2. A method according to claim 1, wherein said animal is a bird.

3. A method according to claim 1, wherein said keratin is selected from the group consisting of animal feather, hair, horn, and hoove.

4. A method according to claim 1, wherein said keratin is ground.

5. A method according to claim 1, wherein said keratin is feather meal.

6. A method according to claim 1, wherein said carbohydrate source is selected from the group consisting of corn meal, oat meal, barley meal, sorghum meal, and combinations thereof.

7. A method according to claim 1, said method further comprising feeding the animal a supplemental second protein source.

8. A method according to claim 1, said method further comprising feeding the animal a supplemental second protein source selected from the group consisting of soy meal, fish meal, blood meal, ground poultry offal, meat meal, and combinations thereof.

9. A method of maintaining an animal on a keratin-containing diet comprising feeding the animal a carbohydrate source and a protein source, said protein source comprising keratin, concurrently with *Bacillus Licheniformis* PWD-1 enzyme in an amount effective to enhance the digestibility of aid keratin in the digestive tract of said animal.

10. A method according to claim 9, wherein said animal is a bird.

11. A method according to claim 9, wherein said keratin is selected form the group consisting of animal feather, hair, horn, and hoove.

* * * * *

UNITED STATES PATENT AND TRADEMARK OFFICE
CERTIFICATE OF CORRECTION

PATENT NO.  :  5,186,961
DATED       :  February 16, 1993
INVENTOR(S) :  Jason C.H. Shih, Chung-Ginn Lee It is certified that error appears in the above-identified patent and that said Letters Patent is hereby corrected as shown below:

Column 4, Line 8, correct "ravaged" to read -- gavaged --.

Column 6, Claim 9, Line 1, correct "aid" to read -- said --.

Signed and Sealed this

Twenty-third Day of November, 1993

Attest:

BRUCE LEHMAN

Attesting Officer        Commissioner of Patents and Trademarks